(12) United States Patent
Liu et al.

(10) Patent No.: US 10,652,185 B2
(45) Date of Patent: *May 12, 2020

(54) INFORMATION SENDING METHOD AND INFORMATION SENDING APPARATUS

(71) Applicant: Beijing Zhigu Rui Tuo Tech Co., Ltd, Beijing (CN)

(72) Inventors: Jia Liu, Beijing (CN); Wei Shi, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 70 days.

This patent is subject to a terminal disclaimer.

(21) Appl. No.: 15/117,187

(22) PCT Filed: Jan. 15, 2015

(86) PCT No.: PCT/CN2015/070769
§ 371 (c)(1),
(2) Date: Aug. 6, 2016

(87) PCT Pub. No.: WO2015/143933
PCT Pub. Date: Oct. 1, 2015

(65) Prior Publication Data
US 2017/0005965 A1    Jan. 5, 2017

(30) Foreign Application Priority Data
Mar. 24, 2014   (CN) .......................... 2014 1 0111352

(51) Int. Cl.
*H04L 29/06*   (2006.01)
*H04L 12/58*   (2006.01)
(Continued)

(52) U.S. Cl.
CPC ............ *H04L 51/14* (2013.01); *G08B 3/1008* (2013.01); *G08B 5/222* (2013.01); *G08B 6/00* (2013.01);
(Continued)

(58) Field of Classification Search
CPC .......... H04W 8/22; H04W 8/18; H04L 51/04; H04L 51/046; H04L 51/14;
(Continued)

(56) References Cited

U.S. PATENT DOCUMENTS

| 8,166,164 B1 | 4/2012 | Luna et al. |
| 8,171,092 B2 * | 5/2012 | Lee .......................... G06F 21/00 709/206 |

(Continued)

FOREIGN PATENT DOCUMENTS

| CN | 1472947 A | 2/2004 |
| CN | 1917483 | 2/2007 |

(Continued)

OTHER PUBLICATIONS

Runbox, "How Email Works", Aug. 2013, runbox.com, web.archive.org/web/20130825145939/https://runbox.com/email-school/how-email-works/ (Year: 2013).*

(Continued)

*Primary Examiner* — Ruolei Zong
(74) *Attorney, Agent, or Firm* — Amin, Turocy & Watson, LLP

(57) ABSTRACT

An information sending method and an information sending apparatus are provided, which relate to the field of wireless communication technologies. A method includes acquiring state information of a receiver device; and determining a sending policy of to-be-sent information according to the state information. According to a method and apparatus in embodiments of the present application, a sending policy is (Continued)

determined according to state information of a receiver device, so that a receiver acquires information as much as it does not change a current state, thereby improving user experience of the receiver.

27 Claims, 3 Drawing Sheets

(51) Int. Cl.
  *H04L 29/08* (2006.01)
  *G08B 3/10* (2006.01)
  *G08B 5/22* (2006.01)
  *G08B 6/00* (2006.01)
  *H04W 8/22* (2009.01)

(52) U.S. Cl.
  CPC ............ *H04L 51/046* (2013.01); *H04W 8/22* (2013.01); *H04L 2212/00* (2013.01)

(58) Field of Classification Search
  CPC ............ H04L 63/0281; H04L 63/0853; H04L 63/0876; H04L 63/1416; H04L 2212/00; G08B 3/1008; G08B 5/222; G08B 6/00; G08B 7/06
  USPC .......................................................... 709/206
  See application file for complete search history.

(56) References Cited

U.S. PATENT DOCUMENTS

| | | | |
|---|---|---|---|
| 8,190,568 B2 * | 5/2012 | Caballero-McCann | H04L 29/06027 707/617 |
| 8,457,604 B2 | 6/2013 | Pereira et al. | |
| 8,812,695 B2 | 8/2014 | Luna et al. | |
| 8,832,228 B2 | 9/2014 | Luna | |
| 9,846,685 B2 * | 12/2017 | Li | G11B 27/10 |
| 2006/0223547 A1 * | 10/2006 | Chin | G06F 1/3287 455/456.1 |
| 2007/0133594 A1 * | 6/2007 | Pazhyannur | H04L 51/063 370/465 |
| 2007/0260456 A1 * | 11/2007 | Proux | H04M 1/72552 704/235 |
| 2008/0057925 A1 | 3/2008 | Ansari | |
| 2008/0186929 A1 * | 8/2008 | Rice | H04L 65/104 370/338 |
| 2009/0097662 A1 * | 4/2009 | Olechowski | G06F 21/554 380/286 |
| 2012/0110110 A1 | 5/2012 | Luna et al. | |
| 2012/0150578 A1 * | 6/2012 | Mangat | G06Q 10/00 705/7.13 |
| 2012/0151044 A1 | 6/2012 | Luna et al. | |
| 2012/0166568 A1 * | 6/2012 | Helbling | H04L 51/36 709/206 |
| 2012/0290717 A1 | 11/2012 | Luna | |
| 2012/0297456 A1 * | 11/2012 | Rose | G06F 21/74 726/4 |
| 2013/0007499 A1 * | 1/2013 | Moy | G06F 3/1423 713/400 |
| 2013/0110948 A1 * | 5/2013 | Davis | G06Q 10/107 709/206 |
| 2013/0219381 A1 | 8/2013 | Lovitt | |
| 2013/0311594 A1 | 11/2013 | Luna et al. | |
| 2014/0052818 A1 | 2/2014 | Alkove et al. | |
| 2014/0067507 A1 | 3/2014 | Costello et al. | |
| 2014/0075046 A1 * | 3/2014 | Wang | H04L 67/104 709/237 |
| 2015/0023160 A1 | 1/2015 | Alisawi | |
| 2015/0023161 A1 | 1/2015 | Alisawi et al. | |
| 2015/0237128 A1 | 8/2015 | Castro et al. | |
| 2015/0264139 A1 * | 9/2015 | Son | H04L 67/125 709/208 |
| 2015/0309723 A1 * | 10/2015 | Zhu | H04M 1/72566 715/771 |

FOREIGN PATENT DOCUMENTS

| | | |
|---|---|---|
| CN | 101146244 | 3/2008 |
| CN | 101622640 A | 1/2010 |
| CN | 101790137 | 7/2010 |
| CN | 102137346 | 7/2011 |
| CN | 103002595 A | 3/2013 |
| CN | 103166998 | 6/2013 |
| CN | 103167445 A | 6/2013 |
| CN | 103581966 A | 2/2014 |
| CN | 103634275 | 3/2014 |
| CN | 103888346 A | 6/2014 |
| CN | 103888916 | 6/2014 |
| KR | 100899872 B1 | 5/2009 |
| WO | 2008027609 A1 | 3/2008 |

OTHER PUBLICATIONS

Aseem Kishore, "Save a List of Running Processes to a Text File in Windows," May 2011, helpdeskgeek.com, helpdeskgeek.com/how-to/save-a-list-of-running-processes-to-a-text-file-in-windows/ (Year: 2011).*
International Search Report for PCT Application No. PCT/CN2015/070769, dated Apr. 21, 2015, 2 pages.
International Search Report for PCT Application No. PCT/CN2015/070774, dated Apr. 21, 2015, 2 pages.
Office Action dated Jun. 2, 2017 for U.S. Appl. No. 15/117,188, 62 pages.

* cited by examiner

INFORMATION SENDING METHOD AND INFORMATION SENDING APPARATUS

RELATED APPLICATION

The present application is a U.S. National Stage filing under 35 U.S.C. § 371 of international patent cooperation treaty (PCT) application No. PCT/CN2015/070769, filed Jan. 15, 2015, and entitled "INFORMATION SENDING METHOD AND INFORMATION SENDING APPARATUS", which claims the benefit of priority to Chinese Patent Application No. 201410111352.4, filed on Mar. 24, 2014, which applications are hereby incorporated into the present application herein by reference in their respective entireties.

TECHNICAL FIELD

Embodiments of the present application relate to the field of wireless communication technologies, and in particular, to an information sending method and an information sending apparatus.

BACKGROUND

Smart devices usually have a separate operating system, where users can install various applications provided by third-party service providers, such as games, instant messaging and navigation, and development of the smart devices bring about more and more conveniences to the users. There are many types of smart devices, such as, smart phones, wearable smart devices (watches, glasses, etc.), and vehicle-mounted smart devices. Such devices may also have a variety of communication manners, for example, traditional voice and short message communication manners, in addition, communication may also be conducted by using various applications such as instant messaging (IM) (for example, WeChat, and QQ) and microblogging (which may also realize instant messaging).

Abundant applications, on one hand, bring about more choices to users, and on the other hand, also bring about some troubles to the users. For example, when an application is running, it is necessary to switch between different applications to view other application messages. Such operations would have some effects on user experience, resulting in that some users choose to delay or ignore information check, and in terms of message senders, effective reception of messages is delayed, which actually reduces communication efficiency of the message senders; and in terms of receivers, they hope to receive information without being disturbed.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed descriptions of the various embodiments that follow in the disclosure.

An example, non-limiting objective of the present application is to provide an information sending solution.

To these and/or related ends, in a first aspect, an embodiment of the present application provides an information sending method, and the method includes:
  acquiring state information of a receiver device; and
  determining a sending policy of to-be-sent information according to the state information.

In a second aspect, an embodiment of the present application provides an information sending apparatus, and the apparatus includes:
  an information acquisition module, configured to acquire state information of a receiver device; and
  a policy determination module, configured to determine a sending policy of to-be-sent information according to the state information.

In a third aspect of the embodiments of the present application, a computer readable storage device is provided, comprising at least one executable instruction, which, in response to execution, causes a system comprising a processor to perform operations, comprising:
  acquiring state information of a receiver device; and
  determining a sending policy of to-be-sent information according to the state information.

In a fourth aspect of the embodiments of the present application, a device for information sending is provided, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:
  acquiring state information of a receiver device; and
  determining a sending policy of to-be-sent information according to the state information.

According to a method and the apparatus in example embodiments of the present application, a sending policy is determined according to state information of a receiver device, so that a receiver acquires information as much as it does not change a current state, thereby improving user experience of the receiver.

DETAILED DESCRIPTION

Figure 1:
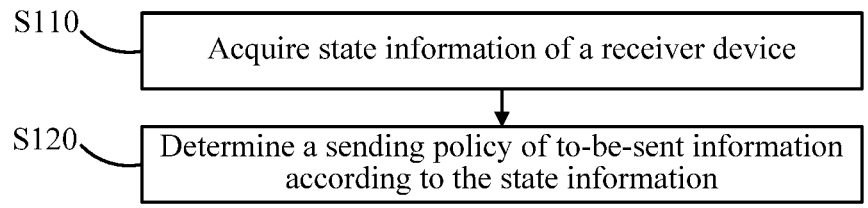
FIG. 1 is an example flowchart of an information sending method according to an embodiment of the present application.

Embodiments of the present application are described in detail hereinafter with reference to the accompanying drawings (the same reference numerals in several drawings indicate the same elements) and embodiments. The following embodiments are intended to describe the present application, but not to limit the scope of the present application.

An information sending method in embodiments of the present application runs on an information sender, including a possibility of running on a sending device and running on a third-party device partially or wholly independent of the sending device. As shown in FIG. 1, the method includes the following steps.

S110. Acquire state information of a receiver device.

A method in an embodiment of the present application is used to process to-be-sent information and then send the information to a receiver device, and before sending information to a receiver, a sender may perform an operation of acquiring state information of a receiver device. The receiver device includes a target receiving device to which the sender originally wants to send the to-be-sent information, and further includes other devices associated with the target receiving device. The other devices associated with the target receiving device refer to other devices belonging to a receiver user and/or other devices that the receiver user can use currently, for example, the target receiving device is a smart phone of the receiver user, other devices associated with the smart phone may include a tablet PC and a smart watch of the user or a portable computer and a smart TV that the user can use currently, and the other devices associated with the target receiving device may communicate with the target receiving device. The state information includes information of an application state and/or a system state of the target receiving device, and may further include information of application states and/or system states of other devices associated with the target receiving device. The application state includes an application currently running on the device, such as, an IM application, a music playback application, or a reading application. The system state includes current states of interfaces of the device and/or an on/off state of a current screen and/or a current reminder mode, and the reminder mode includes at least one of the following reminder manners: a visual reminder, an audio reminder, and a touch reminder, for example, a current reminder mode of the device for received information (for example, a short message) is flashing (the screen and/or indicator) and/or vibration and/or an audio prompt.

S120. Determine a sending policy of to-be-sent information according to the state information.

The sending policy refers to how the to-be-sent information is processed and then sent to the corresponding receiver device, and in a method of an embodiment of the present application, determining a sending policy includes determining a manner of sending the to-be-sent information.

To sum up, according to a method in an embodiment of the present application, a sending policy is determined according to state information of a receiver device, so that a receiver acquires information as much as it does not change a current state, thereby improving user experience of the receiver.

In addition, in a possible embodiment, in step S110, the state information of the receiver device may be acquired in a direct or indirect manner. The direct manner means acquiring the state information from a target receiving device without affecting user experience of the receiver, that is, acquiring the state information from a target receiving device in a manner that the target receiving device can provide the state information thereof without interrupting or changing the current state. The indirect manner means acquiring the state information of the receiver device from a third-party device, for example, any device that can transfer communication between a sender and a receiver, such as an Internet serve (for example, an IM servers and a short message server), a home gateway, and an access point (AP) device. In this case, the target receiving device has informed the third-party device of the state information of the receiver device, and the sender may acquire the state information from the third-party device. Either directly or indirectly, the process of acquiring the state information may be as follows.

S111. Send a request for acquiring the state information to the target receiving device or at least one of the above third-party devices. When the request is sent to at least one third-party device, the request should include identification information associated with the target receiving device, such as, an IM ID, a device ID, and an SIM card number.

S112. Receive an acknowledgement to the request, the acknowledgement including the state information of the receiver device.

In addition, in a method of an embodiment of the present application, many sending policies may be determined according to different states of the receiver device, so as to fully improve user experience of the receiver.

In a possible embodiment, the state information at least includes an application state of the target receiving device, and the sending policy may be determined according to the application state of the target receiving device: determining, according to an application currently running on the target receiving device, the sending policy of sending the to-be-sent information in a manner corresponding to the application. For example, in response to that the currently running application is multiple IM applications, the to-be-sent information is sent in a manner corresponding to any one of the IM applications; in response to that the currently running application is a music player, the to-be-sent information is sent in a manner of voice inserting. It should be noted that, if the target receiving device currently runs many kinds of applications, the information may be sent in a manner corresponding to any kind of application.

In another possible embodiment, the state information at least includes a system state of the target receiving device, and the sending policy may be determined according to the system state of the target receiving device. The system state may include current states of interfaces of the device and/or an on/off state of a screen and/or a current reminder mode, the sending policy may be determined with reference to the states of the interfaces, the sending policy may be determined with reference to the on/off state of the screen, the sending policy may be determined with reference to the reminder mode, or the sending policy may be determined by comprehensively considering at least two factors in the current states of the interfaces, the on/off state of the screen and the reminder mode. For example, in response to that the current screen of the target receiving device is in an on state, the to-be-sent information is sent through a short message or a voice signal; in response to that the current screen of the target receiving device is in an on state but the reminder mode is a visual reminder in the case of mute, the to-be-sent information is sent through a text message; in response to that the current screen of the target receiving device is in an off state and the audio interface is in a connection state, the information is sent through a voice signal.

In still another possible embodiment, the state information at least includes an application state and a system state of the target receiving device, and the sending policy may be determined according to the application state and the system state of the target receiving device. According to the original intention of providing good user experience, the application state and the system state of the target receiving device are considered comprehensively. For example, in response to that the target receiving device is running an IM application and the audio interface is in a connection state, the information is sent through a voice signal corresponding to the IM; in response to that the target receiving device is running an IM application and is in a mute mode, the information is sent through a short message corresponding to the IM; in response to that the target receiving device is running an audio/video playback application and the audio interface is in a connection state, the information may be sent through a voice signal; in response to that the target receiving device and the audio interface are in a connection state and the screen is off, the information is sent through a sound signal; and so on.

In still another possible embodiment, the state information at least includes a system state and/or an application state of the target receiving device and system states and/or application states of other devices associated with the target receiving device, and the state information may be considered comprehensively. For example, in response to that the screen of the target receiving device is in an off state and the reminder mode is a mute mode, the sending policy may be determined according to a policy similar to the state information of the target receiving device with reference to the state information of the associated devices, which is not repeated herein.

After the sending policy is determined with reference to the above process, a method in an embodiments of the present application further includes the following steps.

S130: Send the to-be-sent information according to the sending policy.

Step S130 may further include the following step.

S131. Encapsulate the to-be-sent information according to the sending policy, for example, convert information in a text format to information in a voice format, convert information encapsulated according to a first IM message to information encapsulated in a manner corresponding to a second IM message, and so on.

According to different factors referenced by specific sending policies, the to-be-sent information may be sent to the target receiving device, and if the state information of other devices associated with the target receiving device includes identification information of the associated devices, the to-be-sent information may also be sent to the other devices associated with the target receiving device.

In addition, in order to provide a sender user with good user experience, no matter what form (for example, a voice signal or a short message) the user inputs, the sending device may automatically perform step S130, and may also determine whether to perform step S130 according to a user command. At this time, embodiments of the present application may further include the following step.

S140. Prompt the sending policy, for example, query the sender user through a short message whether to input the to-be-sent information in a manner determined by the sending policy, for example, directly input a short message or a voice signal, or send the to-be-sent information by selecting an IM application the same as that of the receiver.

To sum up, according to a method in an embodiment of the present application, a sending policy is determined according to state information of a receiver device, various application and/or system states of the receiver device are considered comprehensively, which may realize information transmission through good experience of the receiver user as much as possible, so that the user acquires information without changing the current state, and in addition, user experience of the sender user is also fully considered.

Those skilled in the art should understand that, in a method of a specific embodiment of the present application, sequence numbers of the steps do not mean an order of execution, the order of execution of the steps should be determined according to functions and internal logic thereof, but should not pose any limitation to the implementation process of the example embodiments of the present application.

Figure 2:
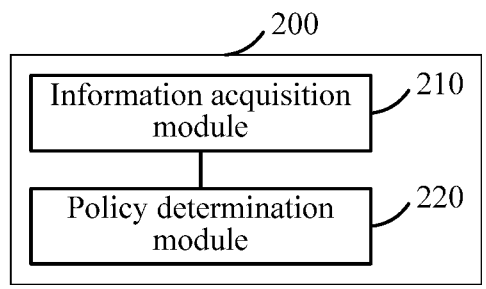
FIG. 2 is an example structural diagram of an information sending apparatus according to an embodiment of the present application.

An embodiment of the present application further provides an information sending apparatus, and the apparatus may be a part of a sender device partially or wholly, or is an apparatus independent of a sending device. As shown in FIG. 2, the information sending apparatus 200 provided in the embodiment of the present application includes the following modules.

An information acquisition module 210 is configured to acquire state information of a receiver device.

An apparatus in embodiments of the present application is configured to process to-be-sent information and then send the processed information to a receiver device, and before a sender sends information to a receiver, the information acquisition module 210 may perform an operation of acquiring state information of a receiver device. The receiver device includes a target receiving device to which the sender originally wants to send the to-be-sent information, and further includes other devices associated with the target receiving device. The other devices associated with the target receiving device refer to other devices belonging to a receiver user and/or other devices that the receiver user can use currently, for example, the target receiving device is a smart phone of the receiver user, other devices associated with the smart phone may include a tablet PC and a smart watch of the user or a portable computer and a smart TV that the user can use currently, and the other devices associated with the target receiving device may communicate with the target receiving device. The state information includes information of an application state and/or a system state of the target receiving device, and may further include information of application states and/or system states of other devices associated with the target receiving device. The application state includes an application currently running on the device, such as, an IM application, a music playback application, or a reading application. The system state includes current states of interfaces of the device and/or an on/off state of a current screen and/or a current reminder mode, and the reminder mode includes at least one of the following reminder manners: a visual reminder, an audio reminder, and a touch reminder, for example, a current reminder mode of a device for received information (for example, a short message) is flashing (the screen and/or indicator) and/or vibration and/or an audio prompt.

A policy determination module 220 is configured to determine a sending policy of to-be-sent information according to the state information.

The sending policy refers to how the to-be-sent information is processed and then sent to the corresponding receiver device, and in the apparatus of an embodiment of the present application, determining a sending policy includes determining a manner of sending the to-be-sent information.

To sum up, according to an apparatus in an embodiment of the present application, a sending policy is determined according to state information of a receiver device, so that a receiver acquires information as much as it does not change a current state, thereby improving user experience of the receiver.

Figure 3:
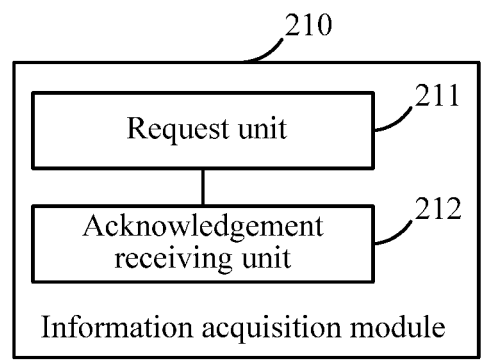
FIG. 3 is an example structural diagram of an information acquisition module in an information sending apparatus according to an embodiment of the present application.

In addition, in one possible embodiment, the information acquisition module 210 may acquire the state information of the receiver device in a direct or indirect manner. The direct manner means acquiring the state information from a target receiving device without affecting user experience of the receiver, that is, acquiring the state information from a target receiving device in a manner that the target receiving device can provide the state information thereof without interrupting or changing the current state. The indirect manner means acquiring the state information of the receiver device from a third-party device, for example, any device that can transfer communication between a sender and a receiver, such as an Internet serve (for example, an IM server and a PUSH server), a home gateway, and an AP device. In this case, the target receiving device has informed the third-party device of the state information of the receiver device, and the sender may acquire the state information from the third-party device. Either directly or indirectly, as shown in FIG. 3, the information acquisition module 210 may include the following units.

A request unit 211 is configured to send a request for acquiring the state information to the target receiving device or at least one of the third-party devices; when the request is sent to at least one third-party device, the request should include identification information associated with the target receiving device, such as, an IM ID, a device ID, and an SIM card number.

An acknowledgement receiving unit 212 is configured to receive an acknowledgement to the request, the acknowledgement including the state information.

In addition, in the apparatus of embodiments of the present application, the policy determination module 220 may determine many sending policies according to different states of the receiver device, so as to fully improve user experience of the receiver.

Figure 4:
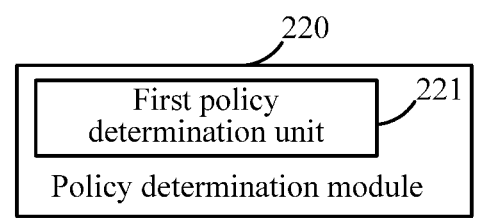
FIG. 4 is an example structural diagram of a policy determination module in an information sending apparatus according to an embodiment of the present application.

In a possible embodiment, the state information at least includes an application state of the target receiving device, and the policy determination module 220 may determine the sending policy according to the application state of the target receiving device; in this case, as shown in FIG. 4, the policy determination module 220 may include a first policy determination unit 221, configured to determine, according to an application currently runnings on the target receiving device, the sending policy of sending the to-be-sent information in a manner corresponding to the application. For example, in response to that the currently running application is multiple IM applications, the to-be-sent information is sent in a manner corresponding to any one of the IM applications; in response to that the currently running application is a music player, the to-be-sent information is sent in a manner of voice inserting. It should be noted that, if the target receiving device currently runs many kinds of applications, the first policy determination unit 221 may send the information in a manner corresponding to any kind of application.

In another possible embodiment, the state information at least includes a system state of the target receiving device, and the policy determination module 220 may determine the sending policy according to the system state of the target receiving device. The system state may include current states of interfaces and/or an on/off state of a screen and/or a current reminder mode, the sending policy may be determined with reference to the states of the interfaces, the sending policy may be determined with reference to the on/off state of the screen, the sending policy may be determined with reference to the reminder mode, or the sending policy may be determined by comprehensively considering at least two factors in the current states of the interfaces, the on/off state of the screen and the reminder mode. For example, in response to that the current screen of the target receiving device is in an on state, the to-be-sent information is sent through a short message or a voice signal; in response to that the current screen of the target receiving device is in an on state but the reminder mode is a visual reminder in the case of mute, the to-be-sent information is sent through a text message; in response to that the current screen of the target receiving device is in an off state and the audio interface is in a connection state, the information is sent through a voice signal.

In still another possible embodiment, the state information at least includes an application state and a system state of the target receiving device, and the policy determination module 220 may determine the sending policy according to the application state and the system state of the target receiving device. According to the original intention of providing good user experience, the application state and the system state of the target receiving device are considered comprehensively. For example, in response to that the target receiving device is running an IM application and the audio interface is in a connection state, the information is sent through a voice signal corresponding to the IM; in response to that the target receiving device is running an IM application and is in a mute mode, the information is sent through a short message corresponding to the IM; in response to that the target receiving device is running an audio/video playback application and the audio interface is in a connection state, the information may be sent through a voice signal; in response to that the target receiving device and the audio interface are in a connection state and the screen is off, the information is sent through a sound signal; and so on.

In still another possible embodiment, the state information at least includes a system state and/or an application state of the target receiving device and system states and/or application states of other devices associated with the target receiving device, and the policy determination module 220 may consider the state information comprehensively. For example, in response to that the screen of the target receiving device is in an off state and the reminder mode is a mute mode, the sending policy may be determined according to a policy similar to the state information of the target receiving device with reference to the state information of the associated devices, which is not repeated herein.

Figure 5:
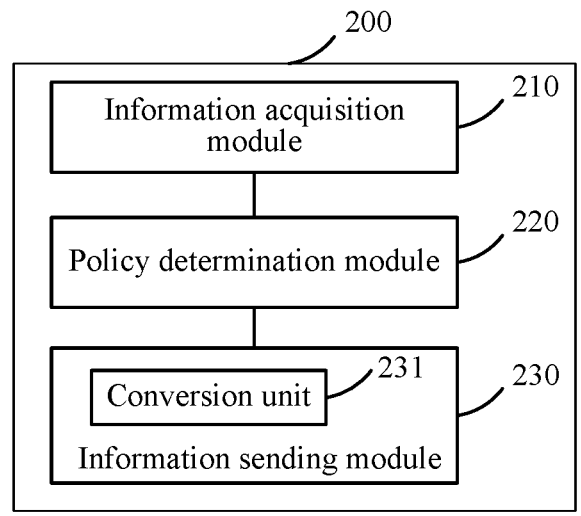
FIG. 5 is a second example structural diagram of an information sending apparatus according to an embodiment of the present application.

As shown in FIG. 5, the apparatus 200 in an embodiment of the present application further includes the following module.

An information sending module 230 is configured to: after the policy determination module 220 determines the sending policy, send the to-be-sent information according to the sending policy. It may be understood that the information sending module 230 may further include the following unit.

A conversion unit 231 is configured to encapsulate the to-be-sent information according to the sending policy.

Figure 6:
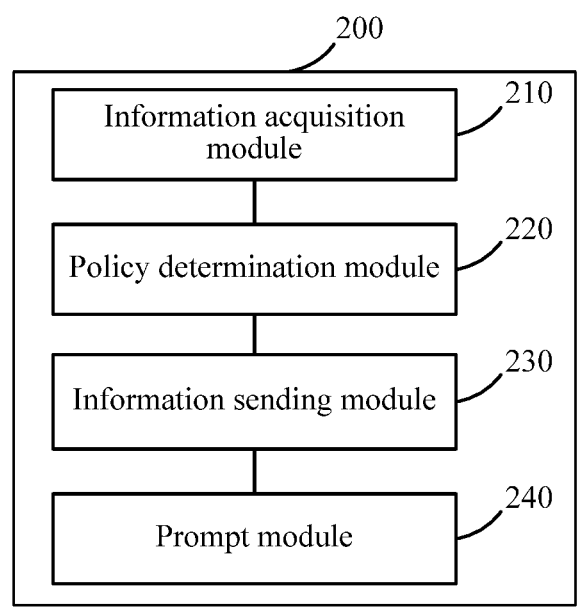
FIG. 6 is a third example structural diagram of an information sending apparatus according to an embodiment of the present application.

In addition, in order to provide a sender user with good user experience, no matter what form (for example, a voice signal or a short message) the user inputs, the information sending module 230 may automatically send the to-be-sent information according to the determined sending policy, and may also determine according to a user command whether to send the information according to the determined sending policy. Correspondingly, as shown in FIG. 6, the apparatus 200 in an embodiment of the present application may further include the following module.

A prompt module 240 is configured to prompt the sending policy, for example, query the user, through a short message, whether to input the to-be-sent information in a manner determined by the sending policy, for example, directly input a short message or a voice signal, or send the to-be-sent information by selecting an IM application the same as that of the receiver.

To sum up, according to an apparatus in an embodiment of the present application, a sending policy is determined according to state information of a receiver device, various application and/or system states of the receiver device are considered comprehensively, which can realize information transmission through good experience of the receiver user as much as possible, so that the user acquires information without changing the current state, and in addition, user experience of the sender user is also fully considered.

Various embodiments of the present application are further described below through specific examples.

Example 1

User A, through a mobile phone, sends a text message to a mobile phone of User B. According to a possible embodiment of the present application, before sending the text message, the User A's mobile phone sends a request for acquiring state information of the User B's device to an SMS server or the User B's mobile phone, and receives an acknowledgement from the SMS server or the User B's mobile phone. It may be known according to the state information included in the acknowledgement that the current screen of the User B's mobile phone is off and the audio interface is in a connection state, and thus it may be inferred that the User B may be using the mobile phone to listen to audio information or using the mobile phone to watch video information, thereby determining to send information input by the User A through a voice signal. In this case, the User A's mobile phone automatically converts a short message input by the user from a text format to a voice signal and sends the converted short message.

Example 2

User A sends, through a mobile phone, a first IM application message to a mobile phone of User B. According to a possible embodiment of the present application, before sending the short message, the User A's mobile phone sends a request for acquiring state information of the User B's device to a first IM application server or the User B's mobile phone, and receives an acknowledgement from the first IM application server or the User B's mobile phone. It may be known according to the state information included in the acknowledgement that the User B's mobile phone is currently running a second IM application, thereby determining to send information input by the User A in a manner corresponding to the second IM application. In this case, the User A's mobile phone automatically encapsulates the first IM application message input by the user into a second IM application message and sends the second IM application message.

Example 3

User A sends, through a mobile phone, a first IM application message to a mobile phone of User B. According to a possible embodiment of the present application, before sending the message, the User A's mobile phone sends a request for acquiring state information of the User B's device to a first IM application server or the User B's mobile phone, and receives an acknowledgement from the first IM application server or the User B's mobile phone. It may be known according to the state information included in the acknowledgement that the current screen of the User B's mobile phone is off and muted and that the User B's tablet PC is running a second IM application, thereby determining to send information input by the User A in a manner corresponding to the second IM application. In this case, the User A's mobile phone automatically encapsulates the first IM application message input by the user into a second IM application message and sends the second IM application message.

Figure 7:
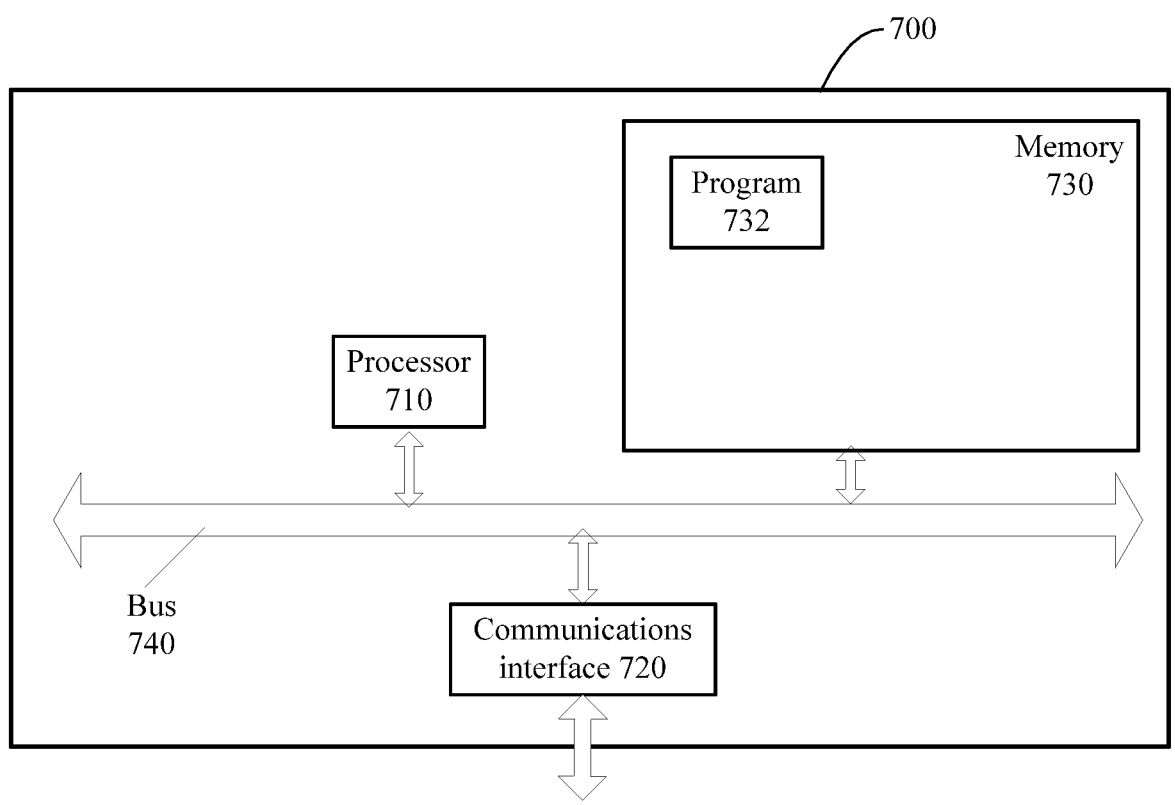
FIG. 7 is a fourth example structural diagram of an information sending apparatus according to an embodiment of the present application.

FIG. 7 is a schematic structural diagram of another information sending apparatus 700 according to an embodiment of the present application, and the specific embodiment of the present application does not limit specific implementation of the information sending apparatus 700. As shown in FIG. 7, the information sending apparatus 700 may include:

a processor 710, a communications interface 720, a memory 730, and a communications bus 740.

The processor 710, the communications interface 720, and the memory 730 complete mutual communications via the communications bus 740.

The communications interface 720 is configured to communicate with a network element such as a client.

The processor 710 is configured to execute a program 732, and specifically, may implement relevant functions of the information sending apparatus in the apparatus embodiment shown in FIG. 2 to FIG. 6.

Specifically, the program 732 may include a program code, the program code including a computer operation instruction.

The processor 710 may be a central processing unit (CPU), or an application specific integrated circuit (ASIC), or be configured to be one or more integrated circuits which implement an embodiments of the present application.

The memory 730 is configured to store the program 732. The memory 730 may include a high-speed RAM memory, and may also include a non-volatile memory, for example, at least one magnetic disk memory. The program 732 may specifically perform the following steps:

acquiring state information of a receiver device; and determining a sending policy of to-be-sent information according to the state information.

Although the subject matter described herein is provided in a general context executed in combination with execution of an operating system and applications on a computer system, those skilled in the art may realize that other embodiments may also be executed in combination with other types of program modules. Generally, the program modules include routines, programs, components, data structures and other types of structures executing particular tasks or implement particular abstract data types. Those skilled in the art may understand that, the subject matter described herein may be practiced with other computer system configurations, including handheld devices, multi-processor systems, microprocessor-based or programmable consumer electronic products, minicomputers, mainframe computers, etc., and may also be used in a distributed computing environment in which tasks are executed by remote processing devices connected via a communication network. In the distributed computing environment, the program modules may be located in both local and remote memory storage devices.

It may be appreciated by those of ordinary skill in the art that each exemplary unit and method step described with reference to the embodiments disclosed herein may be implemented by electronic hardware or a combination of computer software and electronic hardware. Whether these functions are executed in a hardware mode or a software mode depends on particular applications and design constraint conditions of the technical solution. The professional technicians may use different methods to implement the functions described with respect to each particular application, but such embodiment should not be considered to go beyond the scope of the present application.

If the functions are implemented in the form of a software functional unit and is sold or used as an independent product, it may be stored in a computer-readable storage medium. Based on such understanding, the technical solution of the present application essentially or the part which contributes to the prior art or a part of the technical solution may be embodied in the form of a software product, and the computer software product is stored in a storage medium, and includes several instructions for enabling a computer device (which may be a personal computer, a server, a network device, or the like) to execute all or some steps of the method described in each embodiment of the present application. The foregoing computer-readable storage medium includes physical volatile and non-volatile, removable and non-removable media implemented in any manner or technology of storing information such as computer-readable instructions, data structures, program modules or other data. The computer-readable storage medium specifically includes, but is not limited to, a USB disk, a mobile hard disk, a read-only memory (ROM), a random access memory (RAM), an erasable programmable read-only memory (EPROM), an electrically erasable programmable read-only memory (EEPROM), a flash memory or another solid state memory technology, a CD-ROM, a digital versatile disk (DVD), an HD-DVD, a Blue-Ray or other optical storage devices, magnetic tape, magnetic disk storage or other magnetic storage devices, or any other media that can be used to store required information and can be accessed by a computer.

The above embodiments are merely used to describe the present application, instead of limiting the present application; various alterations and variants may be made by those of ordinary skill in the art without departing from the spirit and scope of the present application, so all equivalent technical solutions also belong to the scope of the present application, and the scope of patent protection of the present application should be defined by claims.

What is claimed is:

1. A method for sending an audio message of a first instant message application for audio information, comprising:
   sending, by a device comprising a processor, a request for acquiring state information of a target receiving device to a third-party device, wherein the request includes identification information associated with the target receiving device, and the third-party device is an instant message server independent of the sending device and the target receiving device;
   receiving, from the third-party device, an acknowledgement to the request, the acknowledgement including the state information, wherein the state information comprises currently running applications of the target receiving device; and
   determining, by the device, a sending policy of the audio message according to the state information, the sending policy comprises:
      determining that the target receiving device is in a silent mode and that a second instant message application for text information is running on the target receiving device; and
      converting the audio message to a text message so as to be presented by the second instant message application.

2. The method of claim 1, wherein the acquiring the state information of the receiver device comprises:
   sending a request for acquiring the state information, the request comprising identification information of the target receiving device; and
   receiving an acknowledgement to the request, the acknowledgement comprising the state information.

3. The method of claim 1, wherein the state information comprises a system state of the target receiving device.

4. The method of claim 3, wherein the determining the sending policy of the according to the state information comprises:
   determining the sending policy according to the system state of the target receiving device.

5. The method of claim 4, wherein the system state comprises at least one of a current state of an interface or an on or off state of a screen or a current reminder mode.

6. The method of claim 5, wherein the current reminder mode comprises at least one of a visual reminder, an audio reminder, or a touch reminder.

7. The method of claim 3, wherein the determining the sending policy of the audio message according to the state information comprises:
   determining the sending policy according to an application state and the system state of the target receiving device.

8. The method of claim 1, wherein the state information further comprises at least one of an application state or a system state of another device associated with the target receiving device.

9. The method of claim 8, wherein the application state and the system state of the other device are a first application state and a first system state, and wherein the determining the sending policy of the audio message according to the state information comprises:
   determining the sending policy according to at least one of a second application state or a second system state of the target receiving device and the at least one of the first application state or the first system state of the other device associated with the target receiving device.

10. The method of claim 1, further comprising:
    sending the audio message according to the sending policy.

11. The method of claim 10, wherein the sending the audio message according to the sending policy comprises:
    prompting the sending policy.

12. The method of claim 10, wherein the sending the audio message according to the sending policy comprises:
    encapsulating the audio message according to the sending policy.

13. An apparatus for sending an audio message of a first instant message, comprising:
    a memory having stored therein executable modules;
    a processor, coupled to the memory, that executes or facilitates execution of the executable modules, the executable modules comprising:
       an information acquisition module configured to:
          send a request for acquiring state information of a target receiving device to a third-party device, wherein the request includes identification information associated with the target receiving device, and the third-party device is an instant message server independent of the sending device and the target receiving device, and receive, from the third-party device, an acknowledgement to the request, the acknowledgement including the state information, wherein the state information comprises currently running applications of the target receiving device; and a policy determination module configured to determine a sending policy of the audio message according to the state information, the sending policy comprises:

determining that the target receiving device is in a silent mode and that a second instant message application for text information is running on the target receiving device; and converting the audio message to a text message so as to be presented by the second instant message application.

14. The apparatus of claim 13, wherein the information acquisition module comprises:

a request unit configured to send a request for acquiring the state information, the request comprising identification information of a receiving device; and an acknowledgement receiving unit configured to receive an acknowledgement to the request, the acknowledgement comprising the state information.

15. The apparatus of claim 13, wherein the policy determination module determines the sending policy according to a system state of the target receiving device.

16. The apparatus of claim 13, wherein the policy determination module determines the sending policy according to an application state and a system state of the target receiving device.

17. The apparatus of claim 13, wherein the policy determination module determines the sending policy according to at least one of an application state or a system state of the target receiving device and at least one of an application state or a system state of another device associated with the target receiving device.

18. The apparatus of claim 13, wherein the executable modules further comprise:

an information sending module configured to send the audio message according to the sending policy.

19. The apparatus of claim 18, wherein the executable modules further comprise:

a prompt module configured to prompt the sending policy.

20. The apparatus of claim 18, wherein the information sending module comprises:

a conversion unit configured to encapsulate the audio message according to the sending policy.

21. A non-transitory computer readable medium, comprising at least one executable instruction for sending an audio message of a first instant message application for audio information, which, in response to execution, causes a system comprising a processor to perform operations, comprising:

sending, by a device comprising a processor, a request for acquiring state information of a target receiving device to a third-party device, wherein the request includes identification information associated with the target receiving device, and the third-party device is an instant message server independent of the sending device and the target receiving device;

receiving, from the third-party device, an acknowledgement to the request, the acknowledgement including the state information, wherein the state information comprises currently running applications of the target receiving device; and determining a sending policy of the audio message for transmission according to the state information, the sending policy comprises:

determining that the target receiving device is in a silent mode and that a second instant message application for text information is running on the target receiving device; and converting the audio message to a text message so as to be presented by the second instant message application.

22. A device for sending an audio message of a first instant message application for audio information, comprising a processor and a memory, wherein the memory stores executable instructions, the processor being connected with the memory via a communication bus, and when the device is operating, the processor executes or facilitates execution of the executable instructions stored by the memory to cause the device to perform operations, comprising:

sending, by the device, a request for acquiring state information of a target receiving device to a third-party device, wherein the request includes identification information associated with the target receiving device, and the third-party device is an instant message server independent of the sending device and the target receiving device:

receiving, from the third-party device, an acknowledgement to the request, the acknowledgement including the state information, wherein the state information comprises currently running applications of the target receiving device; and based on the state information, determining a sending policy of the audio message to be transmitted, the sending policy comprises:

determining that the target receiving device is in a silent mode and that a second instant message application for text information is running on the target receiving device; and converting the audio message to a text message so as to be presented by the second instant message application.

23. The non-transitory computer readable medium of claim 21, wherein the acquiring the state information of the target receiving device comprises:

sending a request for acquiring the state information, the request comprising identification information of the target receiving device; and receiving an acknowledgement to the request, the acknowledgement comprising the state information.

24. The non-transitory computer readable medium of claim 21, wherein the state information comprises a system state of the target receiving device.

25. The non-transitory computer readable medium of claim 24, wherein the determining the sending policy of the audio message according to the state information comprises:

determining the sending policy according to the system state of the target receiving device.

26. The non-transitory computer readable medium of claim 24, wherein the system state comprises at least one of a current state of an interface or an on or off state of a screen or a current reminder mode.

27. The non-transitory computer readable medium of claim 26, wherein the current reminder mode comprises at least one of a visual reminder, an audio reminder, or a touch reminder.

* * * * *